Jan. 23, 1945. H. E. JACOBUS 2,367,781
SEAL STRUCTURE
Filed May 23, 1942
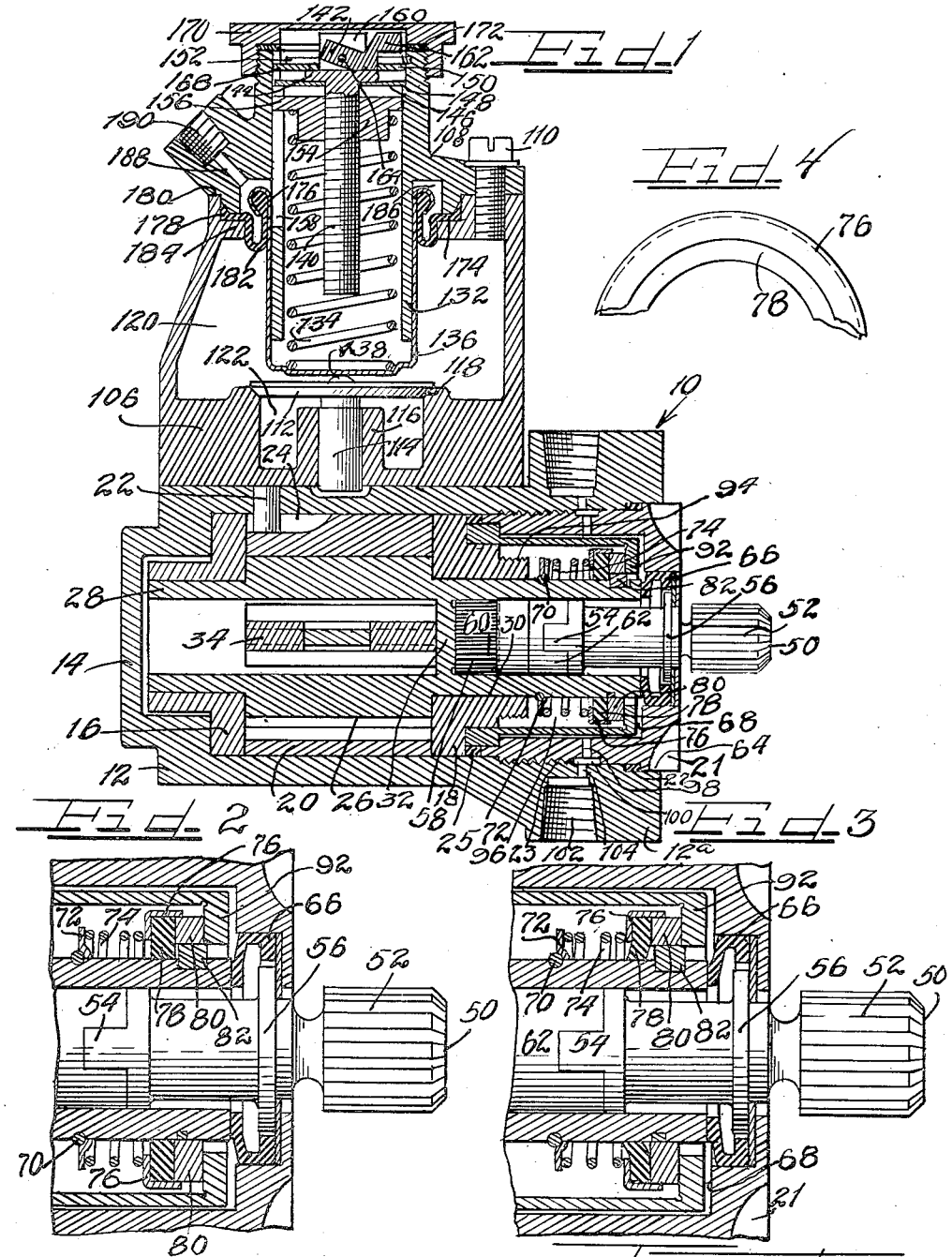
Inventor
Harland E. Jacobus
Charles W. Hills
by Attys.

Patented Jan. 23, 1945

2,367,781

UNITED STATES PATENT OFFICE 2,367,781

SEAL STRUCTURE

Harland E. Jacobus, Cleveland, Ohio, assignor to Thompson Products, Inc., a corporation of Ohio Application May 23, 1942, Serial No. 444,159

1 Claim. (Cl. 286—7)

This invention relates to an improved seal structure particularly adapted for preventing leakage of liquid fuel or lubricating oil along a shaft or other rotating element for driving a liquid fuel pump or the like.

Where shafts or like rotating elements extend through two chambers or spaces, such chambers or spaces are conventionally sealed from each other by a seal structure including an annular cup containing a resilient annular packing. This annular cup and packing combination, although fitted tightly around the shaft or other rotating member, is normally movable lengthwise of the shaft and is urged, as by a spring, against a seal ring keyed to rotate with the shaft but also movable lengthwise thereof. The seal ring is urged by force transmitted through the cup-packing assembly against a stationary seal seat provided by a cup-shaped seal housing or the like extending from the structural means defining one or both of the chambers traversed by the shaft to be sealed off. An example of such a seal structure may be found in the "Aircraft fuel pump" of the patent to Russell R. Curtis, No. 2,268,804, issued January 6, 1942.

Now it sometimes happens that in conventional seal structures of the type described the resilient packing contained in the seal cup shrinks on exposure to extremes in temperature, to liquid fuel or to lubricating oil, or due to aging of the resilient material of construction. Since the packing originally fits the shaft or rotating element closely, shrinkage will cause the packing to adhere or stick to the shaft so that the spring or other pressure on the cup-packing assembly will be absorbed thereby and will not be transmitted to the sealing ring to urge the sealing ring against the stationary seal seat. Shrinkage of the packing will therefore bring about inefficient sealing and consequent leakage through the seal structure.

According to the present invention, the annular cup holding the packing liable to shrink is made, not with a close fit against the shaft or rotating member, as in conventional seals, but with an enlarged central aperture providing ample clearance between the inner margins of the seal cup and the shaft or rotating member. Then, when and if the packing contained in the seal cup should happen to shrink and adhere to the shaft, the seal cup and the outer portions of the resilient packing will still transmit pressure to the sealing ring, the annular flexible packing being bent in the direction of pressure. Thus an efficient seal will be maintained in spite of any shrinkage of the resilient annular packing.

It is therefore an important object of the present invention to provide an improved seal structure including a resilient packing liable to shrink and a seal cup so constructed as to insure efficient sealing even after shrinkage of the resilient packing.

Another important object of this invention is to provide an improved seal structure for a shaft or other rotating member including a seal cup-resilient packing assembly capable of transmitting pressure to a sealing ring abutting against a seal seat even after said packing has shrunk and adhered to the shaft or other rotatable member.

A further important object of the invention is to provide an improved seal construction for a shaft or other rotating element including an annular seal cup-resilient packing assembly adapted to transmit pressure through its peripheral margin onto a sealing ring rotatively abutting against a seal seat whereby freezing of said packing on said shaft or rotating element will not interfere with efficient sealing.

Still another object of the invention is to provide an annular seal cup-resilient packing assembly adapted for mounting on a shaft or other rotating element including a packing adapted to snugly embrace the shaft or rotating element and a seal cup adapted to freely clear the shaft or rotating element.

A further object of the invention is to provide an annular seal cup-resilient packing assembly adapted for mounting on a shaft or other rotating element which assembly can be flexed in the axial direction of the shaft or other rotating element so that freezing of the assembly on the shaft or rotating element will not prevent transmission of axial pressure through said assembly.

Other and further objects, features and advantages of the present invention will become apparent from the appended claim and from the following detailed description of a pump including a seal construction according to this invention. This pump is depicted in the accompanying drawing, in which:

Figure 1 is a vertical axial section through the pump, with parts shown in elevation;

Figure 2 is an enlarged fragmentary view similar to Figure 1 showing the seal structure of the pump of Figure 1 before the resilient packing has shrunk;

Figure 3 is a view similar to that of Figure 2 showing the seal structure after the resilient packing has shrunk and adhered to the shaft which it embraces;

Figure 4 is a fragmentary plan view of a seal cup-resilient packing assembly according to this invention.

Apart from the features pointed out specifically, the pump shown on the drawing and indicated generally by the reference numeral 10, is essentially similar to the pump of the Curtis Patent No. 2,268,804.

The pump body 12 is closed by a rear end wall 14 (see Fig. 1) and bored intermediate the ends to concentrically support the rear bearing 16, the front bearing 18, and the eccentrically bored pump cylinder 20. The bearings and cylinder are preferably press fitted one against the other in the body, the cylinder being additionally positioned and held against rotation by the pin 22 which extends through the body into a keyway 24, preferably cut in the thicker portion of the cylinder wall. A cup shaped seal nut 21 having external threads 23 fitted to appropriate internal threads in the body 12 closes the open end of the body, and, together with resilient seal rings 25 and 27 holds the bearings and cylinder in place and provides against leakage between the seal nut and body.

The rotor 26 has a rear journal 28 and a front journal 30 rotatable in bearings 16 and 18 respectively. The rotor is hollowed for lightness and other reasons, a blind hole extending into the rear journal and through the rotor body and another into the front journal, a partition wall 32 separating the inner ends of the two holes.

The rotor 26 is transversely slotted to slidably receive three intersecting through-blades 34, the cylinder bore and ends of the blades being so formed that the blade ends contact the cylinder wall at all points in their rotation.

The pump drive comprises a drive shaft 50 externally splined on its outer end as at 52 to slidably enter corresponding internal splines in the end of an engine shaft or other power take off. The inner end has a driving tongue 54. A collar 56 intermediate the ends holds the shaft from any appreciable axially outward movement.

At the bottom of the hole in the front journal 30 adjacent the partition 32 is a driving member 58 which is secured in driving relation to the journal 30 by a plurality of relatively fine serrations 60 cut exteriorly on the member and heat treated to a high degree of hardness. Near the bottom, the interior surface of the hole in the journal may be left soft so that when the member 58 is pressed into the hole it will cut its own splines for joining the member and shaft in driving relation.

The outer end of the member 58 is transversely slotted to slidably receive a corresponding tongue in the Oldham coupling member 62, the outer end of the coupling member being transversely slotted at 90 degrees from its tongue to fit slidably over the tongue 54 on the inner end of the drive shaft 50. The hole in journal 30 is enough larger than the outer diameter of the coupling 62 and shaft 50 to allow for considerable universal action of the shaft.

A pilot 64 on the seal nut 21 is adapted to enter a corresponding recess in the end of the engine bearing to effect substantial concentricity between the engine and pump axes, the flange 12a being bolted to the engine by screws (not shown), whereby lubricating oil from the engine bearing may readily find its way to the Oldham coupling member 62 and its cooperating parts.

A sealing ring 66, preferably of molded synthetic rubber or similar material is pressed into a counterbored opening in the inner face of the seal nut 21. The ring 66 is of somewhat greater overall dimensions axially as it comes from the mold than it is when in place as shown, whereby the face of the ring after assembly exerts a considerable axial pressure against the end face of the journal 30, thereby effectively preventing any substantial amount of oil from the engine bearing or from the interior of the journal from escaping into the drain space 68 or other parts of the pump.

In order to prevent such leakage of fuel as may escape between the front bearing 18 and front journal 30 from passing through and into the drain space 68, a highly effective seal must be provided. The seal structure is best shown in Figures 2 and 3 and includes a spring ring 70 snapped into a groove in the outside of the journal 30 to hold a spring retaining washer 72, against which one end of the seal spring 74 bears.

The other end of the seal spring bears against a cup 76 which contains the packing ring 78. Ring 78 may preferably be made of synthetic rubber, the hole being of such size as to fit the outside of the journal 30 tightly so as to prevent leakage between the outside of the journal and the inside of the ring. As shown clearly in Figures 2 to 4, the seal cup 76 loosely embraces the journal 30.

A sealing ring 80 is compelled to rotate in unison with the journal 30 by a key 82.

The outside of the front bearing 18 should be finished truly concentric with the bore and the seal housing 92 fitted closely thereover. The end face of the housing and the shoulder on the bearing 18 which are in contact must both be faced to a true plane at right angles to the pump axis.

The external threads 94 which appear on the bearing 18 are provided for pulling the bearing out when disassembling the pump, there being no corresponding internal threads in the seal housing 92 which is clamped in place only by the seal nut 21. The resilient seal rings 25 and 27 are made enough wider than the space they ultimately occupy that when the nut 21 is drawn solidly against the seal housing, the rings will be under proper compression to make a tight joint.

The surfaces of the seal ring 80 and seal housing 92 which are in relatively rotatable contact are preferably finished to mirror-like smoothness and are kept in rubbing contact by the spring 74 which presses the cup 76 against the packing ring 78 which in turn presses against the seal ring 80, the parts 70, 72, 74, 76, 78, and 80 all having unitary rotation with the journal 30.

It will be seen that any fuel escaping between the bearing 18 and journal 30 is caught in the seal chamber 96. The amount of leakage fuel escaping from chamber 96 is extremely small because of the tight fit of the packing ring 78 over the journal 30 and the spring pressure contact of the packing ring with the seal ring 80 all of which surfaces have unitary rotation, as well as the spring pressure contact of the highly finished metallic contacting surfaces between the rotatable seal ring 80 and the stationary seat in the end of the seal housing 92.

The sealing ring 80 will be maintained in sealing contact with the stationary seat in the end of the seal housing 92 even when the packing ring 78 has shrunk and adhered to the journal 30, for, as shown in Figure 3, the packing ring 78 will then simply be flexed axially. Due to the fact that the seal cup 76 clears the journal 30 widely, the seal cup-packing assembly is capable of transmitting the required axial pressure exclusively through its peripheral parts. Of course, the seal spring 74 must be coiled sufficiently large to bear against the seal cup 76 rather than against the inner portions of the resilient packing 80 not covered by the seal cup.

Since some slight leakage may at times occur from the seal chamber into the drain space 68, the small hole 98 connects the space 68 with an annular groove 100 encircling the seal nut 21 which in turn is connected with the pipe tapped holes 102 by the small holes 104. Opposite drain holes are provided so that the pump may be mounted the other side up when desired.

One advantage of the combination seal and drive will be obvious. The rotatable seal ring 80, being carried on the journal 30, and not on the drive shaft 50 as in general practice, is not subject to eccentric rotation tending to unseat it when the drive shaft makes use of its universal joint to rotate eccentrically under slight misalignment.

The arrangement possesses the further advantage that any fuel which gets past the rotatable seal ring 80 must do so by moving radially inward against the action of the centrifugal force of its own weight, whereas the escape past a seal which is placed directly at the end of the bearing, as is usually done, is aided by the action of centrifugal force.

The flexible sealing ring 66 permits direct communication between the oil supply of the engine bearing the universal joint, whereby the joint is adequately lubricated, but prevents any considerable engine oil escaping into the drain space 68 or back into the pump, such fuel as escapes into the drain space being prevented from mixing with the engine oil.

The relief valve structure, provided for maintaining the discharge pressure at a constant value, is housed in a valve body 106 which is secured to the pump body 12 by screws (not shown), and a valve head 108 secured to the main valve body 106 by the screws 110.

The relief valve proper is of the poppet type comprising the disc 112 with stem 114 slidable in a hub 116 of the main body 106, the disc being beveled at 118 and having a corresponding angular seat in the body which divides the interior of the body 106 into a suction chamber 120 including all of the space above the disc 112 and a discharge chamber 122 being the space below the disc.

Suitable ducts (not shown) in the pump and valve bodies respectively, connect a suction port to the suction chamber 120, while other ducts in the valve body and pump body respectively, connect the discharge chamber 122 to a discharge port.

Depending from the valve head 108 into the suction chamber 120 is a long hub 132 internally chambered to contain the valve loading spring 134 and externally sized to slidably receive the valve spring cup 136 the bottom of which rests upon a small knob 138 on the upper side of the valve disc 112.

The valve spring adjusting means comprises an adjusting screw 140 with a head 142 and a flange 144 intermediate the screw and head, the flange being of larger diameter than the head. The lower adjusting screw retaining washer 146 rests on a shoulder 148 and has a central opening through which the screw extends freely, the flange 144 resting on the upper face of the washer. The upper retaining washer 150 has a central opening which passes over the screw head 142 loosely and rests on the flange 144. A spring ring 152 is snapped into a groove at the upper edge of the washer 150, the groove being positioned to hold the two washers so spaced as to allow free turning movement of the flange 144 between them.

The spring adjusting nut 154 is tapped to fit the external threads of the screw 140 and has a key 156 extending laterally into the keyway 158 of the valve head 108, whereby the nut is held nonrotatable when the screw is turned, yet may move freely in an axial direction.

The head 142 of the adjusting screw is provided with a deep screw driver slot 160 in which the locking bar 162 is fitted snugly and is hinged therein by the pin 164. The hole in the upper retaining washer 150 has a series of radial notches (not shown) into any one of which the lower edge of the locking bar 162 may be entered. The washer 150 also has a key 168 at its outer edge which extends into the keyway 158 to hold the washer 150 from rotating.

The adjusting screw cap 170 when drawn tightly to the gasket 172, allows but a slight clearance between the inside of the cap and the top of the locking bar 162, whereby the bar is retained in the notch in which it has been placed as long as the cap is in position.

When an adjustment of the spring 134 is to be made, the cap 170 is first removed, then, the simple insertion of a screw driver into the screw slot 160, the locking bar 162 is made to rise out of the radial notch of the washer 150 into which it is entered and the screw may be rotated until the desired adjustment is attained, whereupon the locking bar is pushed into the nearest radial notch and the cap 170 replaced. In a situation where it may be necessary to reach into close spaces to make this adjustment, the desirability of this simple manipulation is obvious. Furthermore, where height is limited, as it is on pumps of this class, a small portion only of the available height is taken by the adjusting and locking means, leaving space for a longer and more flexible spring, whereby larger increments of adjustment may be made with smaller resulting variations in spring stress, making the matter of adjusting for fine variations in discharge pressure not dependent upon skillful or careful manipulation of the adjusting means. The use of a longer and more flexible spring also results in less variation in the discharge pressure at the various speeds of rotation and rates of discharge encountered in the operation of aircraft.

Now, as is well known in the art, the suction head against which the pump operates varies from one instant to the next because of aircraft acceleration, or deceleration, or altitude, or the fact that the fuel tank, when the craft climbs, may be well below the pump, and when it dives, it may be well above it, or vice versa, all depending upon the respective locations of the pump and tank, so that, if an ordinary spring loaded relief valve only were provided, the constant rise and fall of the pressure in chamber 120 would constantly influence the discharge pressure, because the sum total of effort acting against the spring to open the valve would be the discharge pressure, acting to raise the valve from below, added to the suction tending also to raise it but from above. Valves for use in this situation are therefore provided with a balancing means whereby variation in the suction does not add to nor subtract from the forces tending to open the valve, and therefore does not affect the discharge pressure.

The relief valve balancing means herein provided comprises a diaphragm 174 of resilient synthetic rubber preferably with an internal fabric layer (not shown) to give it additional strength. Around the edge of the central opening the material is thickened to provide a ring 176 around which the upper edge of the spring cup 136 is so closely rolled as to form an air tight joint at this point, and prevent the cup and diaphragm from pulling apart in operation.

The diaphragm is also made thicker at the outer edge to form the wedging ring 178, this ring and a small portion of the diaphragm being clamped between the valve body 106 and head 108.

Since the material of the diaphragm is subject to cold flow under excessive pressure, the space between the body 106 and head 108 which contains the outer edge must be carefully made so that when metal to metal contact of the body and head is made at 180, the diaphragm will be gripped tight enough to safely prevent pulling out under the suction pressure in operation, but not tight enough to cause cold flow.

The active portion 182 of the diaphragm is of U shaped cross section which loops downward between the outside of the cup 136 and the inner edge of the annular rib 184 in the body 106.

Since the material composing the diaphragm swells appreciably from gasoline absorption, the loop 182 will drop downward more as the material swells. It will also be drawn upwardly farther as the valve rises to its maximum height. If then, the effective area of the diaphragm is to remain constant under both of these extremes, the sides of the U loop must be so supported as to maintain a constant width under all conditions.

This condition will be met when the drop in the loop 182 and the width of the rib 184 is such that the sides of the loop will be held parallel and to a uniform spacing with each other in all positions. In such a structure the effective area of the diaphragm will be constant for any valve lift and for any degree of swelling of the material, and the discharge pressure will be unaffected by these variations.

The space above the diaphragm, in the form of a chamber 186, is usually connected by a hole 188 to the atmosphere, but may be connected to the intake manifold when a supercharger is employed, by a pipe fitted to the pipe tapped opening 190, causing the fuel discharge pressure to increase directly with rise in manifold pressure.

Obviously, increased suction in the chamber 120 will pull as much harder downwardly on the cup 136 as it does upwardly on the valve disc 112, and the valve closing pressure will be controlled entirely by the spring 134 independently of variations in suction head.

While the improved seal structure of the present invention has hereinabove been described as applied to a specific pump construction, it should be understood that this embodiment of the invention has been described merely by way of an illustrative example. The improved seal structure of this invention is generally applicable to the sealing off from each other of a number of chambers or spaces traversed by a rotating element such as a shaft. Many details of construction may be varied within a wide range without departing from the principles of this invention and it is therefore not my intention to limit the patent granted on this invention otherwise than necessitated by the scope of the appended claim.

What I claim is:

A seal for relatively rotating parts comprising a stationary seal ring, a shaft projecting freely into said ring, a rotating seal ring slidably keyed on said shaft for co-rotation therewith, said rotating seal ring and said stationary seal ring having opposed sealing faces for sliding sealing engagement, said rotating seal ring having a flat face opposite the sealing face thereof, a flat resilient ring of rectangular cross section disposed on said shaft adjacent and in opposed relation to said flat face of the rotating seal ring, said resilient ring snugly embracing the shaft in sealing relation therewith and having contact with the shaft for a length sufficient to inhibit tilting of the ring on the shaft, said resilient ring having substantially parallel flat end faces normally extending radially outward from the shaft and providing opposed annular sealing faces adjacent to the periphery of the ring, a rigid skirted ring having the skirt thereof snugly embracing the peripherial edges of the rotating seal ring and the resilient ring, said skirted ring having an inturned flange overlying the flat end face of the resilient ring opposite the face thereof opposed to the rotating seal ring, said flange terminating radially outward from the shaft, leaving a portion of the resilient ring radially outward from said shaft exposed and a spring acting on said flange of the skirted ring urging said ring and said resilient ring toward the stationary seal ring for maintaining the opposed sealing faces of the rotating seal ring and stationary seal ring in sealing engagement and for maintaining the sealing faces of the resilient ring in sealing engagement with the skirted ring and the rotating seal ring, respectively, the peripherial portion of said resilient ring in the region of said opposed annular sealing faces being axially shiftable relative to the shaft in response to axial movement of the rotatable sealing ring when the resilient ring becomes "frozen" to the shaft due to shrinkage, the uncovered portion of the resilient ring flexing while the resilient ring maintains its position on the shaft.

HARLAND E. JACOBUS.